US010919716B1

(12) United States Patent
Ingram-Brown

(10) Patent No.: US 10,919,716 B1
(45) Date of Patent: Feb. 16, 2021

(54) COVER SLIP DISPENSER APPARATUS

(71) Applicant: Letitia Ingram-Brown, Staten Island, NY (US)

(72) Inventor: Letitia Ingram-Brown, Staten Island, NY (US)

(*) Notice: Subject to any disclaimer, the term of this patent is extended or adjusted under 35 U.S.C. 154(b) by 0 days.

(21) Appl. No.: 16/573,430

(22) Filed: Sep. 17, 2019

(51) Int. Cl.
*B65G 59/06* (2006.01)

(52) U.S. Cl.
CPC .................. *B65G 59/067* (2013.01)

(58) Field of Classification Search
CPC .................................................. B65G 59/067
See application file for complete search history.

(56) References Cited

U.S. PATENT DOCUMENTS

| | | | | |
|---|---|---|---|---|
| 1,890,388 A * | 12/1932 | Kramlik | .................. | A63B 53/14 221/279 |
| 2,431,121 A * | 11/1947 | Hunter | ..................... | G07D 1/08 453/51 |
| 2,760,302 A * | 8/1956 | Cheskin | ................. | A63H 33/00 446/387 |
| 2,788,736 A * | 4/1957 | Bardini | ................... | A47J 19/02 100/232 |
| 3,393,831 A | 7/1968 | Stewart | | |
| 3,623,636 A * | 11/1971 | D'Ercoli | ................. | A47F 1/085 221/64 |
| 3,930,928 A | 1/1976 | Tapert | | |
| 4,113,143 A * | 9/1978 | Spagnola, Jr. | ...... | A63F 11/0002 221/267 |
| D250,220 S | 11/1978 | Berger | | |
| 4,535,913 A * | 8/1985 | Hooie | .................. | A63F 11/0002 221/251 |
| 4,854,761 A * | 8/1989 | Smith | .................. | A45D 29/007 401/196 |
| 5,335,826 A * | 8/1994 | Kazino | ................. | B23P 19/006 221/210 |
| 5,549,750 A | 8/1996 | Kelley | | |
| 5,617,973 A * | 4/1997 | Seto | ................. | G01N 35/00029 221/279 |
| 5,640,889 A * | 6/1997 | Anderson | ............. | B25B 23/065 279/82 |
| 6,135,314 A | 10/2000 | Menes | | |
| 6,589,650 B1 | 7/2003 | Govek | | |
| 7,032,775 B1 * | 4/2006 | Almeer | .................... | B65C 9/262 221/279 |
| 8,302,293 B2 * | 11/2012 | Dehlke | ................. | B23P 19/062 221/309 |

(Continued)

*Primary Examiner* — Gene O Crawford
*Assistant Examiner* — Kelvin L Randall, Jr.

(57) ABSTRACT

A cover slip dispenser apparatus for storing and dispensing microscope cover slides includes a dispenser body having a square top aperture extending through to a dispenser inside. The dispenser inside is configured to store a plurality of cover slips. A bottom frame has a plurality of spring-loaded ball detents to prevent the plurality of cover slips from passing through unless forced. A plunger is coupled within the dispenser inside and is configured to contact a topmost slip of the plurality of cover slips. A spring is coupled within the dispenser inside and is configured to apply pressure on the plunger to arrange the plurality of cover slips against the plurality of ball detents. A lever is coupled to the dispenser body. A lever bottom of the lever is coupled to the spring. The lever is configured to dispense one cover slip of the plurality of cover slips when depressed.

6 Claims, 5 Drawing Sheets

(56) References Cited

U.S. PATENT DOCUMENTS

| | | | | |
|---|---|---|---|---|
| 9,248,559 B2* | 2/2016 | Wang | ............... | B25B 27/00 |
| 2004/0178215 A1* | 9/2004 | Horn | ............... | A63F 3/062 |
| | | | | 221/268 |
| 2013/0223956 A1* | 8/2013 | Gostylla | ............... | B21J 15/025 |
| | | | | 411/501 |
| 2019/0289979 A1* | 9/2019 | Groffsky | ............... | A45D 34/04 |

* cited by examiner

COVER SLIP DISPENSER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to microscope accessories and more particularly pertains to a new microscope accessory for storing and dispensing microscope cover slides.

BRIEF SUMMARY OF THE INVENTION

An embodiment of the disclosure meets the needs presented above by generally comprising a dispenser body having a dispenser front side separated from a dispenser rear side, a dispenser left side separated from a dispenser right side, and a dispenser top side separated from an open dispenser bottom side defining a dispenser inside. The dispenser top side has a square top aperture extending through to the dispenser inside. The dispenser inside is configured to store a plurality of cover slips. A bottom frame is coupled to the open dispenser bottom side. An inner surface of the bottom frame has a plurality of spring-loaded ball detents to prevent the plurality of cover slips from passing through unless forced. A plunger is slidably coupled within the dispenser inside and is configured to contact a topmost slip of the plurality of cover slips. A spring is coupled within the dispenser inside above the plunger and is configured to apply pressure on the plunger to arrange the plurality of cover slips against the plurality of ball detents. A lever is coupled to the dispenser body. The lever is slidably coupled through the top aperture of the dispenser top side. A lever bottom of the lever is coupled to the spring. The lever is configured to dispense one cover slip of the plurality of cover slips when depressed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
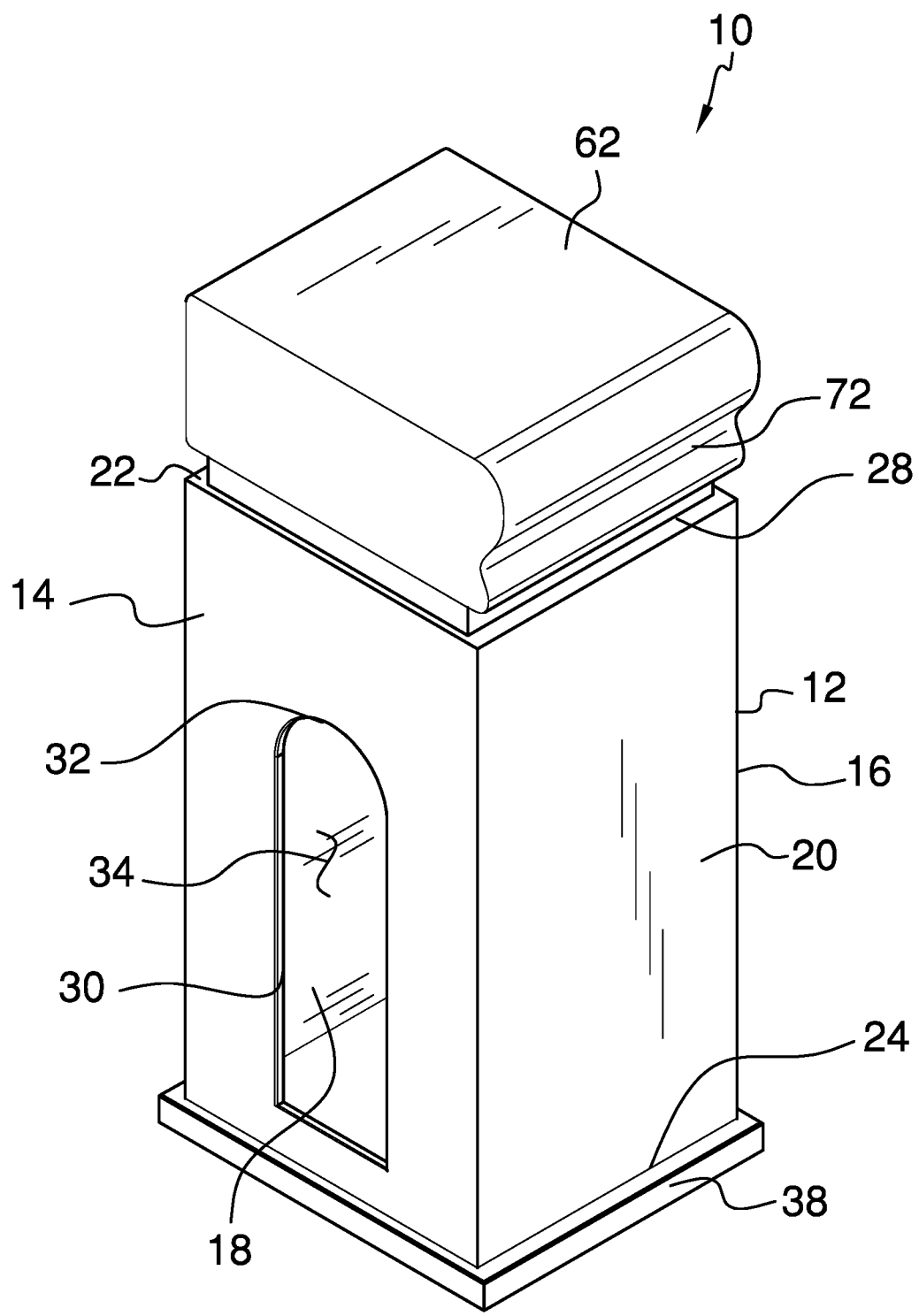
FIG. 1 is an isometric view of a cover slip dispenser apparatus according to an embodiment of the disclosure.
Figure 2:
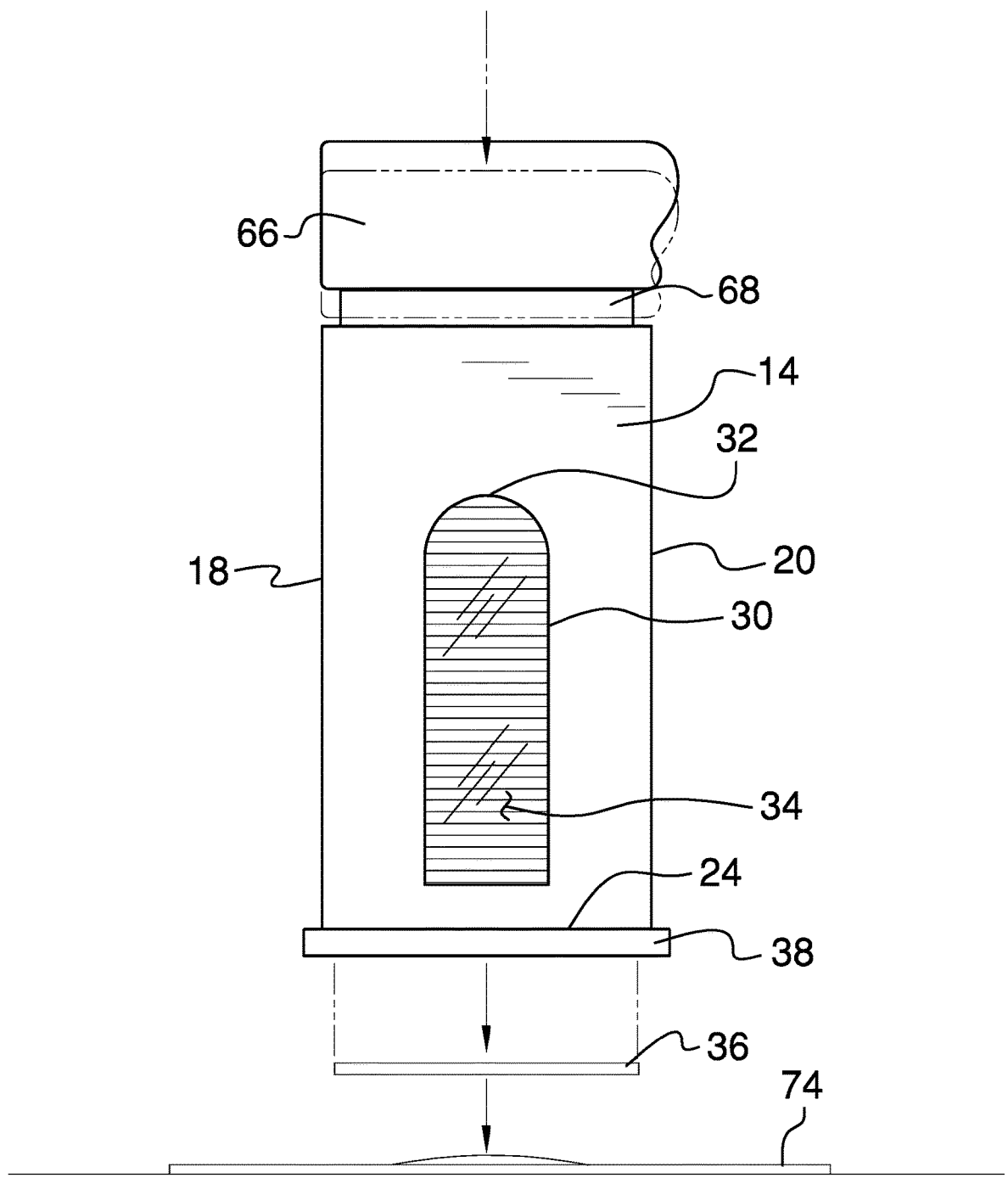
FIG. 2 is a front elevation view of an embodiment of the disclosure.
Figure 3:
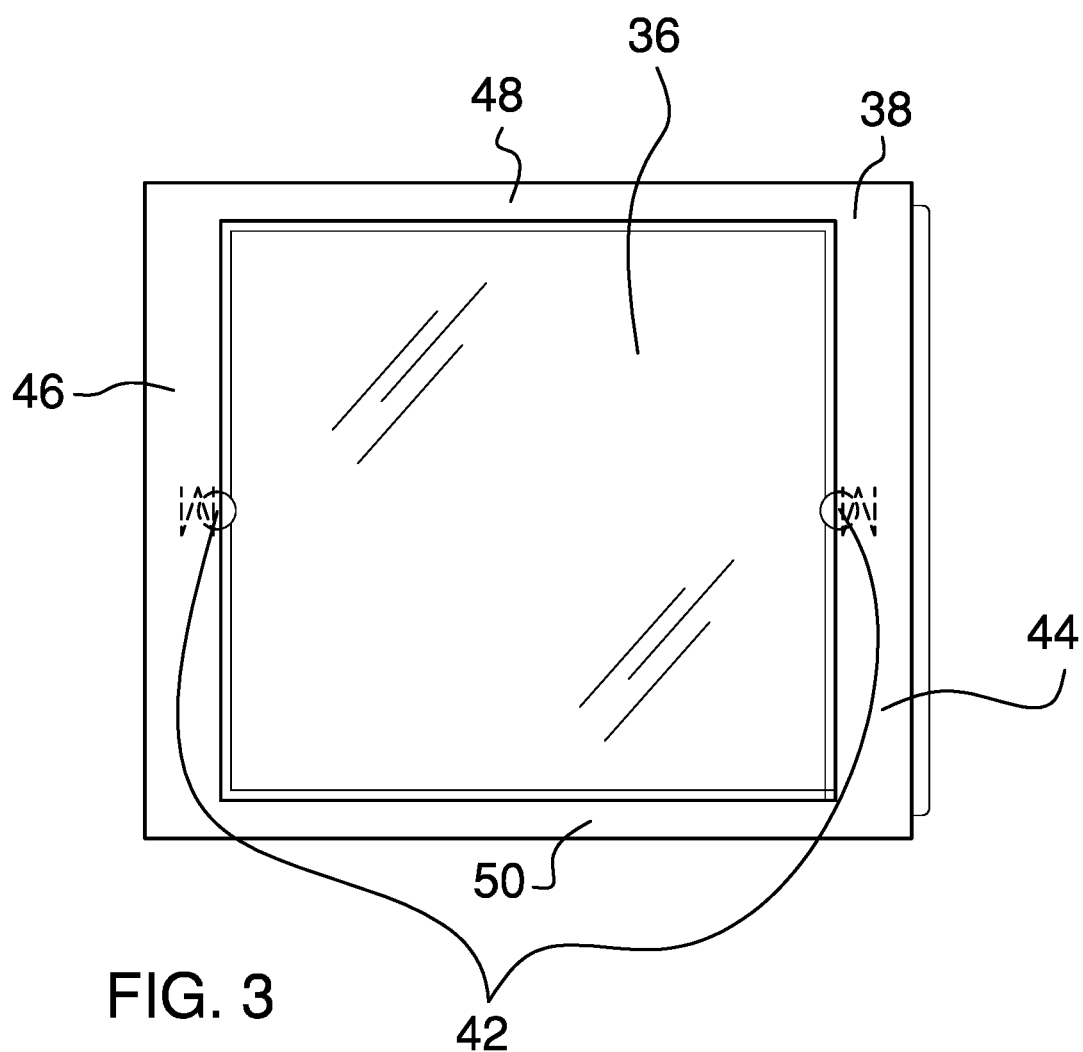
FIG. 3 is a bottom plan view of an embodiment of the disclosure.
Figure 4:
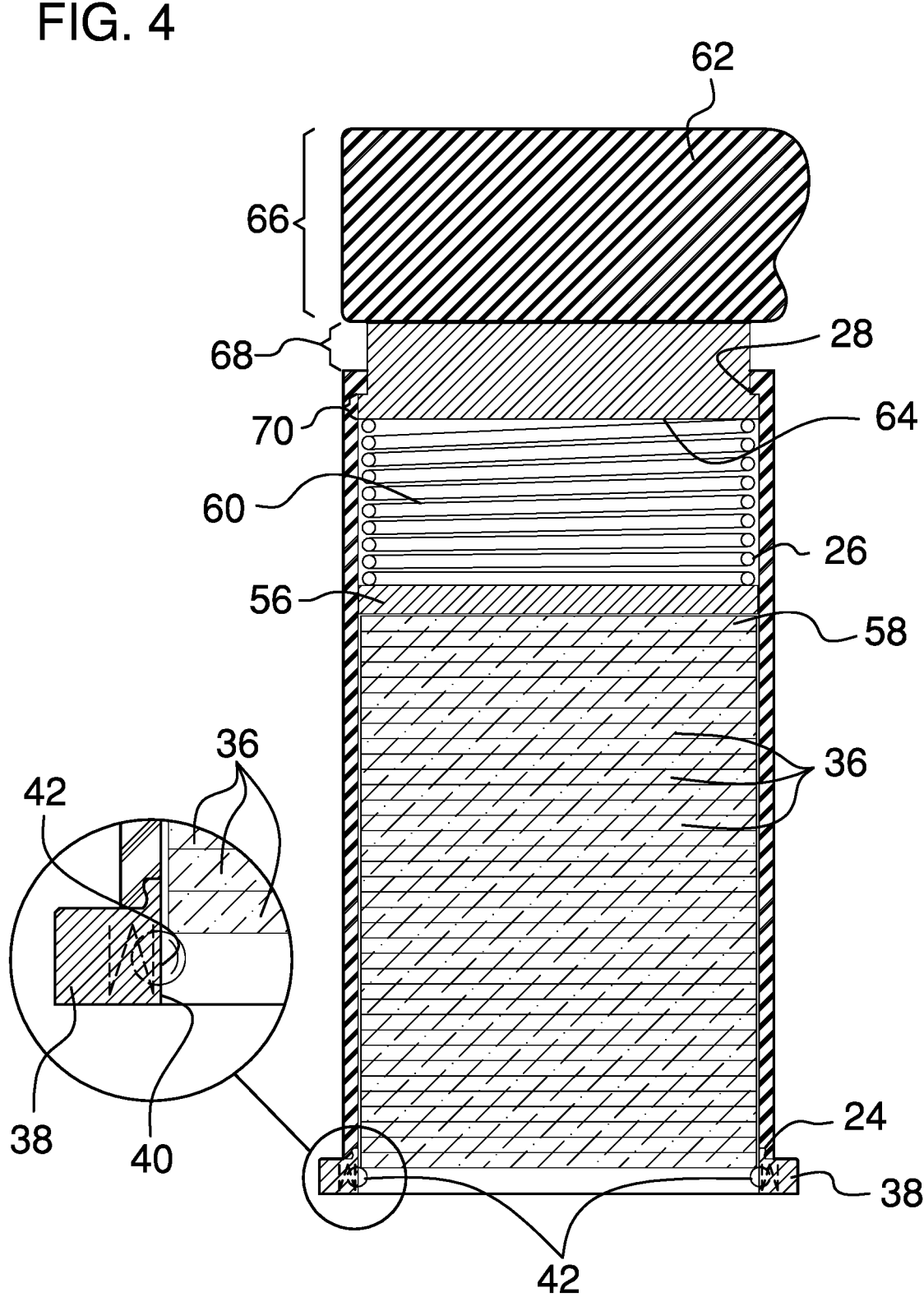
FIG. 4 is a cross-sectional view of an embodiment of the disclosure.
Figure 5:
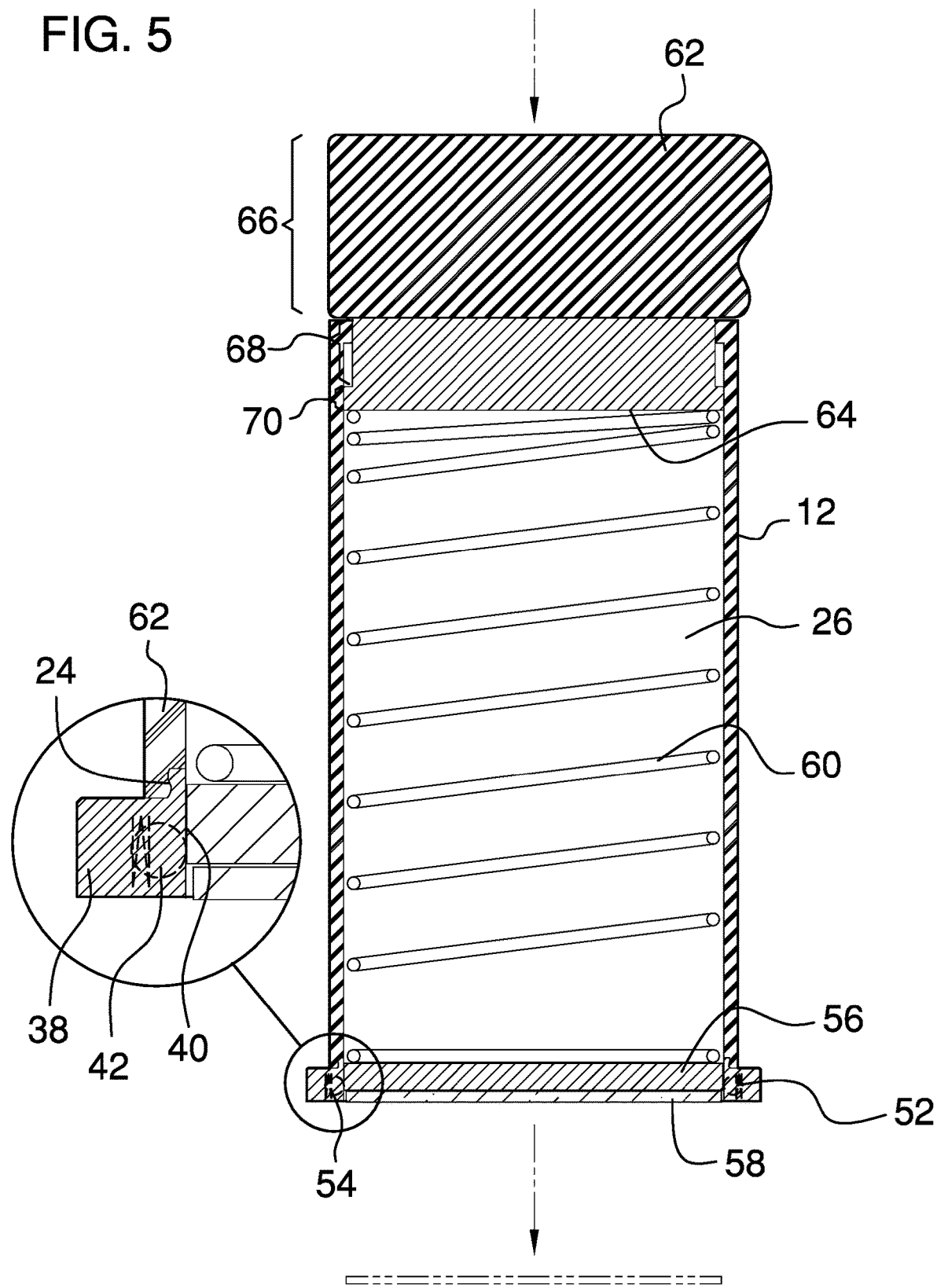
FIG. 5 is a cross-sectional view of an embodiment of the disclosure.

With reference now to the drawings, and in particular to FIGS. 1 through 5 thereof, a new microscope accessory embodying the principles and concepts of an embodiment of the disclosure and generally designated by the reference numeral 10 will be described.

As best illustrated in FIGS. 1 through 5, the cover slip dispenser apparatus 10 generally comprises a dispenser body 12 having a dispenser front side 14 separated from a dispenser rear side 16, a dispenser left side 18 separated from a dispenser right side 20, and a dispenser top side 22 separated from an open dispenser bottom side 24 defining a dispenser inside 26. The dispenser top side 22 has a square top aperture 28 extending through to the dispenser inside 26. The dispenser front side 14 has a window aperture 30 extending through to the dispenser inside 26. A top edge 32 of the window aperture 30 is semicircular. A transparent window 34 is coupled over the window aperture 32. The dispenser inside 26 is configured to store a plurality of cover slips 36. A bottom frame 38 is coupled to the open dispenser bottom side 24. An inner surface 40 of the bottom frame 38 has a plurality of spring-loaded ball detents 42 to prevent the plurality of cover slips 36 from passing through unless forced. A thickness of each of a right frame side 44 and a left frame side 46 of the bottom frame 38 is greater than a thickness of each of a front frame side 48 and a rear frame side 50. The plurality of ball detents 42 comprises a right ball detent 52 and a left ball detent 54 coupled within the right frame side 44 and the left frame side 46, respectively. A plunger 56 is slidably coupled within the dispenser inside 26 and is configured to contact a topmost slip 58 of the plurality of cover slips 36. A spring 60 is coupled within the dispenser inside 26 above the plunger 56 and is configured to apply pressure on the plunger 56 to arrange the plurality of cover slips 36 against the plurality of ball detents 42. A lever 62 is slidably coupled through the top aperture 28 of the dispenser top side 22. A lever bottom 64 of the lever 62 is coupled to the spring 60. The lever 62 has a head portion 66, a leg portion 68, and a foot portion 70. A width of the head portion 66 is greater than a width of the dispenser body 12. The leg portion 68 conforms to the top aperture 28, and the foot portion 70 conforms to the dispenser inside 26. The dispenser body 12, the head portion 66, and the leg portion 68 are each rectangular prismatic. The head portion 66 is rectangular prismatic excepting a head right side 72. The head right side 72 is undulating. The lever 62 is configured to dispense one cover slip 36 of the plurality of cover slips 36 when depressed.

In use, the user loads a plurality of cover slips 36 in the top aperture 28 of the apparatus 10. The user holds the dispenser body 12 and depresses the lever 62 to apply pressure to the spring 60 and thus the plunger 56 to dispense one cover slip 36 past the ball detents 42 onto a slide 74 for a microscope.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cover slip dispenser apparatus comprising:
    a dispenser body having a dispenser front side separated from a dispenser rear side, a dispenser left side separated from a dispenser right side, and a dispenser top side separated from an open dispenser bottom side defining a dispenser inside, the dispenser top side having a square top aperture extending through to the dispenser inside, the dispenser inside being configured to store a plurality of cover slips;
    a bottom frame coupled to the dispenser body, the bottom frame being coupled to the open dispenser bottom side, an inner surface of the bottom frame having a plurality of spring-loaded ball detents to prevent the plurality of cover slips from passing through unless forced;
    a plunger coupled to the dispenser body, the plunger being slidably coupled within the dispenser inside and configured to contact a topmost slip of the plurality of cover slips;
    a spring coupled to the dispenser body, the spring being coupled within the dispenser inside above the plunger and configured to apply pressure on the plunger to arrange the plurality of cover slips against the plurality of ball detents;
    a lever coupled to the dispenser body, the lever being slidably coupled through the top aperture of the dispenser top side, a lever bottom of the lever being coupled to the spring, the lever being configured to dispense one cover slip of the plurality of cover slips when depressed; and
    a thickness of each of a right frame side and a left frame side of the bottom frame being greater than a thickness of each of a front frame side and a rear frame side, the plurality of ball detents comprising a right ball detent and a left ball detent coupled within the right frame side and the left frame side, respectively.

2. The cover slip dispenser apparatus of claim 1 further comprising the lever having a head portion, a leg portion, and a foot portion, a width of the head portion being greater than a width of the dispenser body, the leg portion conforming to the top aperture, and the foot portion conforming to the dispenser inside.

3. A cover slip dispenser apparatus comprising:
    a dispenser body having a dispenser front side separated from a dispenser rear side, a dispenser left side separated from a dispenser right side, and a dispenser top side separated from an open dispenser bottom side defining a dispenser inside, the dispenser top side having a square top aperture extending through to the dispenser inside, the dispenser inside being configured to store a plurality of cover slips;
    a bottom frame coupled to the dispenser body, the bottom frame being coupled to the open dispenser bottom side, an inner surface of the bottom frame having a plurality of spring-loaded ball detents to prevent the plurality of cover slips from passing through unless forced;
    a plunger coupled to the dispenser body, the plunger being slidably coupled within the dispenser inside and configured to contact a topmost slip of the plurality of cover slips;
    a spring coupled to the dispenser body, the spring being coupled within the dispenser inside above the plunger and configured to apply pressure on the plunger to arrange the plurality of cover slips against the plurality of ball detents; and
    a lever coupled to the dispenser body, the lever being slidably coupled through the top aperture of the dispenser top side, a lever bottom of the lever being coupled to the spring, the lever being configured to dispense one cover slip of the plurality of cover slips when depressed, the lever having a head portion, a leg portion, and a foot portion, a width of the head portion being greater than a width of the dispenser body, the leg portion conforming to the top aperture, and the foot portion conforming to the dispenser inside, the dispenser body, the head portion, and the leg portion each being rectangular prismatic, the head portion being rectangular prismatic excepting a head right side, the head right side being undulating.

4. The cover slip dispenser apparatus of claim 1 further comprising the dispenser front side having a window aperture extending through to the dispenser inside, a transparent window being coupled over the window aperture.

5. The cover slip dispenser apparatus of claim 4 further comprising a top edge of the window aperture being semicircular.

6. A cover slip dispenser apparatus comprising:

a dispenser body having a dispenser front side separated from a dispenser rear side, a dispenser left side separated from a dispenser right side, and a dispenser top side separated from an open dispenser bottom side defining a dispenser inside, the dispenser top side having a square top aperture extending through to the dispenser inside, the dispenser front side having a window aperture extending through to the dispenser inside, a top edge of the window aperture being semicircular, a transparent window being coupled over the window aperture, the dispenser inside being configured to store a plurality of cover slips;

a bottom frame coupled to the dispenser body, the bottom frame being coupled to the open dispenser bottom side, an inner surface of the bottom frame having a plurality of spring-loaded ball detents to prevent the plurality of cover slips from passing through unless forced, a thickness of each of a right frame side and a left frame side of the bottom frame being greater than a thickness of each of a front frame side and a rear frame side, the plurality of ball detents comprising a right ball detent and a left ball detent coupled within the right frame side and the left frame side, respectively;

a plunger coupled to the dispenser body, the plunger being slidably coupled within the dispenser inside and configured to contact a topmost slip of the plurality of cover slips;

a spring coupled to the dispenser body, the spring being coupled within the dispenser inside above the plunger and configured to apply pressure on the plunger to arrange the plurality of cover slips against the plurality of ball detents; and a lever coupled to the dispenser body, the lever being slidably coupled through the top aperture of the dispenser top side, a lever bottom of the lever being coupled to the spring, the lever having a head portion, a leg portion, and a foot portion, a width of the head portion being greater than a width of the dispenser body, the leg portion conforming to the top aperture, and the foot portion conforming to the dispenser inside, the dispenser body, the head portion, and the leg portion each being rectangular prismatic, the head portion being rectangular prismatic excepting a head right side, the head right side being undulating, the lever being configured to dispense one cover slip of the plurality of cover slips when depressed.

* * * * *